May 20, 1941. V. F. GREAVES Re. 21,805

COMBINATION CONTAINER AND EJECTOR

Original Filed March 8, 1938 2 Sheets-Sheet 1

INVENTOR.
Valentine F. Greaves.

BY

Chas. E. Townsend.
ATTORNEY

COMBINATION CONTAINER AND EJECTOR

Original Filed March 8, 1938 2 Sheets-Sheet 2

INVENTOR.
Valentine F. Greaves.

BY
Chas. E. Townsend.
ATTORNEY

Reissued May 20, 1941

Re. 21,805

UNITED STATES PATENT OFFICE 21,805

COMBINATION CONTAINER AND EJECTOR

Valentine F. Greaves, Oakland, Calif.

Original No. 2,194,828, dated March 26, 1940, Serial No. 194,591, March 8, 1938. Application for reissue May 1, 1940, Serial No. 332,805

11 Claims. (Cl. 312—92)

This invention relates to a combination container and ejector for stereopticon slides and like devices.

With the advent of the so-called "Kodo-Chrome" film for color photography, and the revival of public interest in stereopticon projection, especially the 2-inch color slides, the desirability of some improved method of storing slides in containers convenient both for transportation and use on a projecting table or stand has become apparent, as the ordinary box, with partitions for the reception of the slides which are in common use at the present time, is not entirely satisfactory in the dark or semi-darkness usually incidental to projecting conditions, as it is difficult to eject the slides that are to be projected, and to lift them out of their respective compartments and to replace them. The object of the present invention is generally to improve and simplify the operation and construction of containers of the character described; to provide a container for slides or similar articles which will be convenient for storage and transportation purposes and which is provided with means for selecting the slides in sequence or in a prearranged schedule of selection; to provide means whereby the prearranged slides are manually raised or elevated one by one to a position where they are easily and readily removed; and further, to provide elevating or ejecting means which automatically raise or elevate the next slide to be projected when the last slide removed from the projector is returned to the container.

The combination container and ejector is shown by way of illustration in the accompanying drawings, in which Fig. 1 is a perspective view of the type of container shown in Fig. 5, said view being partially in section;

Figure 1:
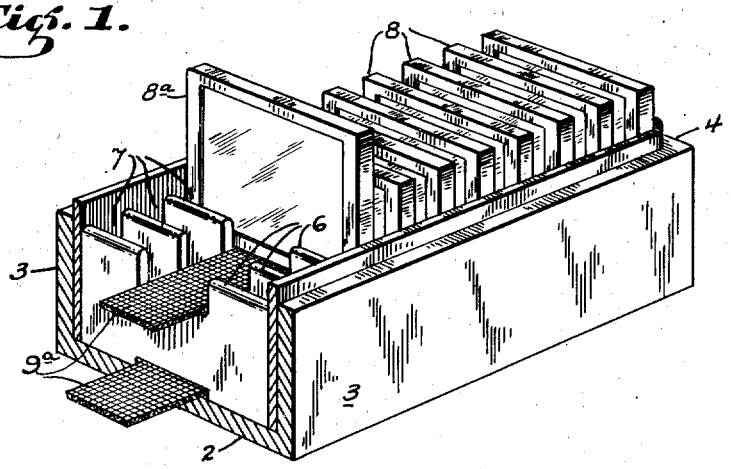
Figure 2:
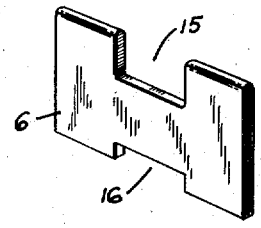
Fig. 2 is a perspective view of one of the partition members.
Figure 3:
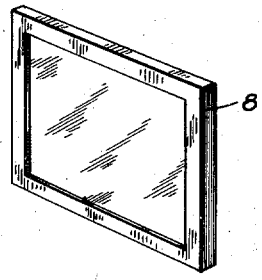
Figure 3 is a perspective view of an ordinary slide.

Referring to the drawings in detail, and particularly to Figs. 1 to 4, it will be noted that a box-shaped container is disclosed which consists of a bottom section 2, sides 3—3, and ends 4 and 5. Extending crosswise of the container is a plurality of partition members 6 forming a series of compartments 7 which are provided for the reception of slides or similar articles, such as indicated at 8. One of the main features of the present invention is to provide means for the ready removal and reinsertion of the slides in the respective compartments, and particularly when projecting pictures in a dark, or at least semi-dark, room where visibility is exceptionally poor, and where the sense of touch will have to be more or less depended upon to locate the slides to be projected. To accomplish this, a flexible member in the form of a ribbon 9 is employed. The ribbon is secured as at 10 (see Fig. 4) to one end of the container, and passes down and under the slide 11, then up and over the partition 6 and then under the next slide, in zigzag formation, until the opposite end 5 of the container is reached. At this point the ribbon passes out through a slot 12 in the end 5 of the container, then through a clamp 14. The ribbon should be fairly wide, in most instances from a quarter to a third the total width of the container, so as to form an ample support for the slides when ejected or elevated, as will be hereinafter described. The ribbon is preferably positioned centrally of the container, that is, midway between the sides thereof, and it is retained in this position by notching the upper and lower edges of the partition members as shown at 15 and 16 (see Fig. 2).

In actual practice, the operator or individual who is going to project or display the slides will first arrange them in the container in the order or sequence which he may desire, this arrangement of the slides being obviously taken care of while there is time and sufficient light for that purpose. Once the slides have been arranged, the lights may be turned off, or the container may be carried into the projecting room and conveniently arranged alongside the projector. The clamp is then released and swung to the dotted line position indicated at 14*a*, to release the ribbon, which is then grasped and a slight pull is exerted. This pull raises the first slide to the dotted line position indicated at 8*a*, where it is in position to be readily grasped and removed. A further pull raises the next slide, and so on, and when three slides have been raised and removed, the ribbon will lie taut across the first three compartments. The clamp should now be lowered to secure the free end of the ribbon, as the fourth slide to be removed will be automatically raised or elevated by the replacement of the slide which was first removed. That is, the average projector usually holds three slides, and when a fourth slide is to be inserted, the first must be removed, and when removed is placed in the first compartment, where it forces the ribbon down into the compartment, thereby raising the fourth slide to position where it can be readily grasped and removed, even though it can not be seen, as the mere operation of running the fingers along the top of the container will cause them to contact the raised slide which is the next in sequence to be displayed. The entire series of slides is run through in this manner, and a mistake can hardly be made, as the insertion of the last slide to be projected or displayed automatically raises or elevates the next slide in the series, and so on until the entire number of slides to be displayed have been removed and reinserted.

Figure 4:
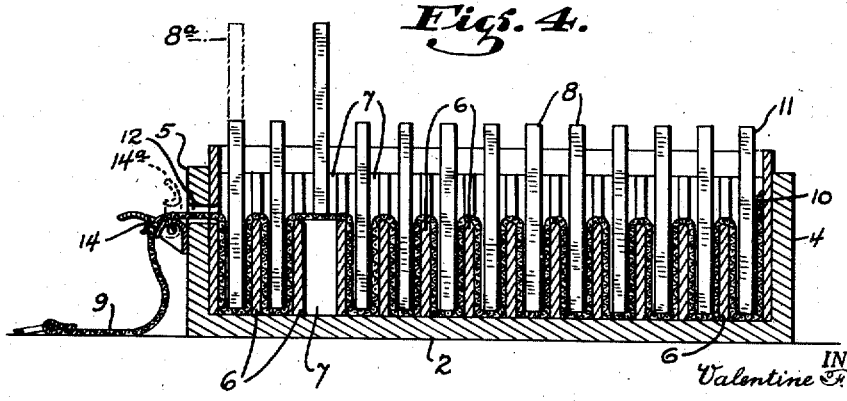
Fig. 4 is a longitudinal central vertical section showing the simplest form of the invention.
Figure 5:
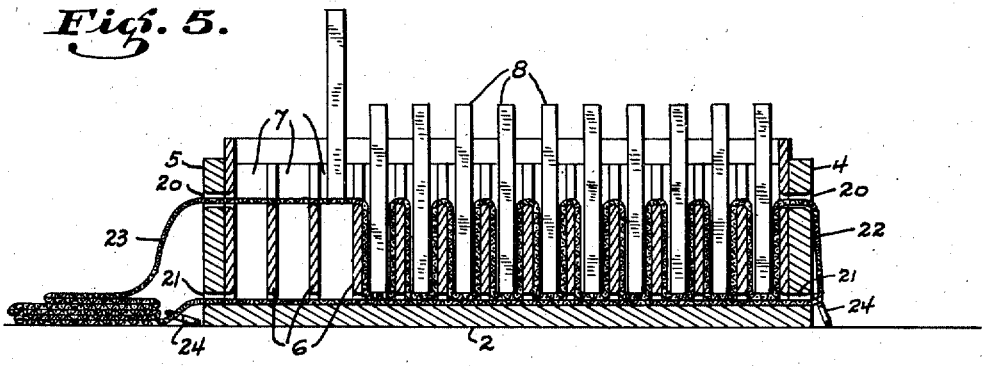
Fig. 5 is a similar section showing another form of the invention.

The form of the invention shown in Fig. 4 is probably the simplest. In Fig. 5 another form is shown. The container employed is identical to that shown in Figs. 1 to 4, and so are the partition members. The only difference is in the arrangement of the ribbon. Upper and lower slots 20 and 21 are formed on opposite sides of the container. The ribbon employed is an endless ribbon. One portion of the ribbon extends longitudinally through the container and rests on the bottom thereof. It passes through the lower slots 21, then forms a loop 22 and 23 at the opposite ends. The upper portion of the ribbon assumes a zigzag form when the slides are placed in the compartments, just as in the structure shown in Fig. 4. With this arrangement of the ribbon, it is possible to raise the slides at either end of the container, by merely exerting a pull on the ribbon. A ring 24, or similarly shaped member, is placed in the loops 22 and 23 so that if the ribbon is drawn up tight against the end of the container it may be readily pulled away therefrom by means of the ring to form a loop which can be gripped by the fingers of the operator.

Figure 6:
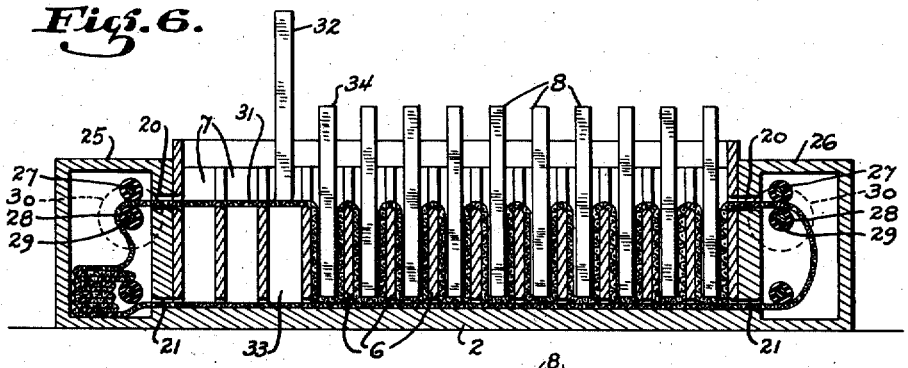
Fig. 6 is also a similar section showing still another form of the invention.

In Fig. 6 the ribbon is arranged exactly as in Fig. 5, the only difference being that compartments such as shown at 25 and 26 are formed at opposite ends of the container, and pairs of feed rollers 27 and 28 are placed adjacent the upper slots. One roller of each pair is provided with a shaft 29 which extends through the side walls of the box, and these shafts are provided with wheels or knobs 30 which may be grasped and rotated. The pairs of rollers 27 and 28 may be covered with rubber or similar means and are so closely fitted that the ribbon is thoroughly gripped by the rollers. Thus, if it is desired to pull the ribbon in either direction, this can be accomplished by turning the knobs 30 which in turn transmit rotary motion to the rollers 27 and 28. The shafts supporting the rollers are snugly fitted in the side walls of the container, or in bearings of a suitable character, so as to frictionally resist rotation of the rollers, this being essential as it is desirable under certain conditions to maintain a portion of the ribbon in a taut condition as shown at 31 (see Fig. 6). This position of the ribbon is assumed when automatic ejection or raising of the slides is desired by reinsertion of slides which have already been projected. For instance, if the slide indicated at 32 (see Fig. 6) is being returned, it will force the ribbon down into the compartment shown at 33. In so doing, it elevates the slide indicated at 34. If the rollers 27 and 28 rotated freely, the ribbon would be pulled from the compartment 25 and the slide 34 would not be raised, but as the rollers are frictionally held against rotation the ribbon will be pulled out of the compartment holding the slide 34 when the slide 32 is depressed, thus causing automatic elevation of one slide when another slide is being returned to its compartment.

Figure 7:
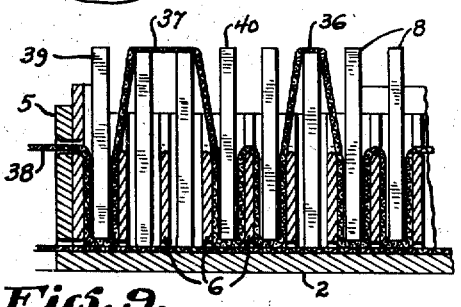
Fig. 7 is a partial vertical longitudinal section showing different manners in which the slides may be arranged in the compartments of the container.

When an individual is going to project a number of slides, he will, as previously stated, prearrange the slides in the different compartments so that they will be ejected or raised in a certain orderly sequence. There may be slides in the container that the operator does not care to show, and in that case he may arrange the ribbon as shown in Fig. 7. That is, he will pass the ribbon over slides such as indicated at 36 and 37. When a pull is exerted on the ribbon at the end indicated at 38, the slide 39 will be raised. The next slide to be raised will be that indicated at 40, as the ribbon passes over the slides indicated at 37. Thus by arranging the ribbon in the manner shown, certain slides may be held in the container against ejection or elevation, while others will be elevated in the sequence desired.

Figure 8:
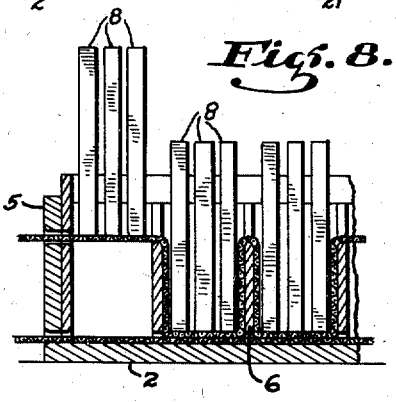
Fig. 8 is a section similar to Fig. 7, showing the arrangement of a plurality of slides or similar articles in each compartment.
Figure 9:
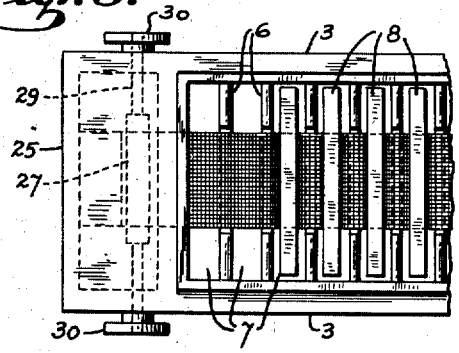
Fig. 9 is a plan view of one end of the form of the invention shown in Fig. 6.

Again, it is possible to place a plurality of slides in each compartment, as shown in Fig. 8.

While the present invention has been particularly designed and described for use in connection with slides, it is obvious that the container may be used for many other purposes such, for instance, as card index systems and for other uses. I similarly wish it understood that while certain features of the invention have been more or less specifically described and illustrated, nevertheless changes may be resorted to within the scope of the appended claims, and the materials and finish of the structure may be such as the maker desires or varying conditions of use require.

Having thus described and illustrated my invention, what I claim and desire to secure by Letters Patent is

1. A combination container and ejector comprising an elongated container having a plurality of partition members extending crosswise thereof to form a series of compartments open at their upper ends for the reception and storage of one or more articles in each compartment, and a flexible member passing over the upper edge of each partition member and under the articles in the compartments, said flexible member extending from end to end of the container and out of one end thereof to permit a pull to be exerted, whereby the articles in the compartments are raised upwardly in the compartments in successive order.

2. A combination container and ejector comprising an elongated container having a plurality of partition members extending crosswise thereof to form a series of compartments open at their upper ends for the reception and storage of one or more articles in each compartment, a flexible member extending from end to end of the container, said flexible member adapted to pass under articles in certain compartments and over articles in other compartments, and means whereby a pull may be exerted on one end of the flexible member to elevate in successive order the articles under which the flexible member passes.

3. A combination container and ejector comprising an elongated container having a plurality of partition members extending crosswise thereof to form a series of compartments open at their upper ends for the reception and storage of one or more articles in each compartment, a flexible member passing over the upper edge of each partition member and under the articles in the compartments, said flexible member extending from end to end of the container and out of one end thereof to permit a pull to be exerted and to elevate at least one article from a compartment and means for securing one end of the flexible member with relation to the container after one article has been elevated and removed, whereby the remaining articles may be automatically raised one by one, in sequence, by replacement of articles formerly removed.

4. A combination container and ejector comprising an elongated container having a plurality of partition members extending crosswise thereof to form a series of compartments open at their upper ends for the reception and storage of one or more articles in each compartment, said container having upper and lower slots formed in each end thereof, and a continuous flexible member extending lengthwise through the container and the slots and forming a loop at each end of the container, one portion of the flexible member extending along a bottom portion formed in the container, and an upper portion of the flexible member passing over the upper edge of each partition member and under the articles in the compartments, so that when a pull is exerted on the upper portion of either loop of the flexible member the articles in the compartments will be raised upwardly therein.

5. A combination container and ejector comprising an elongated container having a plurality of partition members extending crosswise thereof to form a series of compartments open at their upper ends for the reception and storage of one or more articles in each compartment, said container having upper and lower slots formed in each end thereof, a continuous flexible member extending lengthwise through the container and the slots and forming a loop at each end of the container, one portion of the flexible member extending along a bottom portion formed in the container, and an upper portion of the flexible member passing over the upper edge of each partition member and under the articles in the compartments, and means at each end of the container for exerting a pull on the upper portion of the flexible member to raise the articles in the compartments upwardly therein.

6. A combination container and ejector comprising an elongated container having a plurality of partition members extending crosswise thereof to form a series of compartments open at their upper ends for the reception and storage of one or more articles in each compartment, said container having upper and lower slots formed in each end thereof, a continuous flexible member extending lengthwise through the container and the slots and forming a loop at each end of the container, one portion of the flexible member extending along a bottom portion formed in the container, and an upper portion of the flexible member passing over the upper edge of each partition member and under the articles in the compartments, a pair of rollers journaled at each end of the container between which the upper portion of the flexible member passes and whereby the flexible member is frictionally gripped, and means for rotating either set of rollers to exert a pull on the upper portion of the flexible member.

7. A combination container and ejector comprising an elongated container having a plurality of partition members extending crosswise thereof to form a series of compartments, open at their upper ends for the reception and storage of one or more articles in each compartment, a flexible member passing over the upper edge of each partition member and under the articles in the compartments, said flexible member extending from end to end of the container and out of one end thereof to permit a pull to be exerted and to elevate at least one article from a compartment, said flexible member being also adapted to be held after one article has been elevated and removed, so that the remaining articles may be automatically raised one by one by replacement of articles formerly removed.

8. In combination with a container adapted to hold a series of projection slides having a prearranged sequence whereby slides can be progressively removed from a group to be projected and returned to a second group after projection while maintaining said prearranged sequence, of means movably mounted in the container and positioned to engage a slide of each sequence for progressively separating the slides into said two groups.

9. In combination with a container adapted to hold a series of projection slides having a prearranged sequence whereby slides can be progressively removed from a group to be projected and returned to a second group after projection while maintaining said prearranged sequence, of means movably mounted in the container and positioned to engage a slide of each sequence for progressively separating the slides into said two groups and for progressively elevating slides from said first group.

10. In combination with a container adapted to hold a series of projection slides having a prearranged sequence whereby slides can be progressively removed from a group to be projected and returned to a second group after projection while maintaining said prearranged sequence, of means for automatically elevating a slide from the first group responsive to manual return of a slide to the second group after projection.

11. A combination container and ejector for enabling sequential selection and removal of projection slides from a series of slides having a sequential arrangement comprising a container for storage of a series of slides, means for progressively separating said series into two groups as the slides are successively removed from and replaced in said series, and means cooperatively related to said separating means and operable by replacement of a slide into the used group of slides for elevating the next slide in sequence in the unused group of slides.

VALENTINE F. GREAVES.